United States Patent [19]

Highsmith et al.

[11] Patent Number: 5,292,387
[45] Date of Patent: Mar. 8, 1994

[54] PHASE-STABILIZED AMMONIUM NITRATE AND METHOD OF MAKING SAME

[75] Inventors: Thomas K. Highsmith, North Ogden; Carol J. Hinshaw, Pleasant View; Robert B. Wardle, Logan, all of Utah

[73] Assignee: Thiokol Corporation, Ogden, Utah

[21] Appl. No.: 10,391

[22] Filed: Jan. 28, 1993

[51] Int. Cl.$^5$ ............................................. C06B 45/10
[52] U.S. Cl. .................... 149/19.1; 149/45; 149/46; 423/266; 423/396
[58] Field of Search ............... 423/396, 266; 149/19.1, 149/45, 46

[56]  References Cited

U.S. PATENT DOCUMENTS

| | | | |
|---|---|---|---|
| 3,428,667 | 2/1969 | Hamel et al. | 260/467 |
| 4,124,368 | 11/1978 | Boyars | 149/46 |
| 4,552,597 | 12/1985 | Abegg et al. | 149/45 |
| 4,925,600 | 5/1990 | Hommel et al. | 264/3.4 |
| 5,074,938 | 12/1991 | Chi | 149/19.4 |
| 5,076,868 | 12/1991 | Doll et al. | 149/19.4 |
| 5,098,683 | 3/1992 | Mehrotra | 149/46 |
| 5,198,204 | 3/1993 | Bottaro et al. | 423/385 |

FOREIGN PATENT DOCUMENTS

WO91/19669 12/1991 PCT Int'l Appl. .
WO91/19670 12/1991 PCT Int'l Appl. .

OTHER PUBLICATIONS

Oberth, Phase stabilized Ammonium Nitrate For Solid Rocket Propellants, Final Report AFAL-TR-88-010 (Abstract only)(Circa 1988).
N93-094: Process Development for a New Oxidizer for Navy Missile Propellants, SBIR Announcement, Navy 57 (circa Dec. 1992).
Choi et al., Phase Transitions in Ammonium Nitrate, J. Appln. Cryst. 13:403-09 (1980).
Schmitt et al., The Development of New Protecting-/Leaving Groups and Application To The Synthesis of Cage Nitramines, Final Technical Report ONR, Contract No. N00014-88-C-0537, (1993).

*Primary Examiner*—Edward A. Miller
*Attorney, Agent, or Firm*—Ronald L. Lyons; Kendrew H. Colton

[57]  ABSTRACT

Ammonium nitrate is phase-stabilized against Phase IV←→Phase III transition and the undesired volume changes associated with that phase change by including an effective amount of at least one metal dinitramide salt having the formula $MX_n$ wherein M is a metal cation, X is a dinitramide anion, and n is 1, 2 or 3. The phase-stabilized ammonium nitrate is useful in energetic applications such as solid propellants and explosives.

23 Claims, No Drawings

PHASE-STABILIZED AMMONIUM NITRATE AND METHOD OF MAKING SAME

FIELD OF THE INVENTION

This invention relates to phase-stabilizing ammonium salts, and more particularly to ammonium nitrate stabilized with certain metal dinitramide salts and a method for phase-stabilizing ammonium nitrate. The phase stabilized ammonium nitrate of the present invention is useful in energetic applications, such as solid propellants and explosives.

BACKGROUND OF THE INVENTION

Ammonium nitrate contains no halogens, burns without smoke production, and is less detonable than other conventionally employed oxidizing materials. Ammonium nitrate is, other than ammonium perchlorate, one of the few readily available, inexpensive, inorganic oxidizers employed in certain energetic applications, thus making it an attractive candidate for such use.

However, the attractiveness of current commercially available ammonium nitrate in energetic compositions is tempered by several severely limiting drawbacks. Such drawbacks include an energetic performance significantly lower than comparable ammonium perchlorate-based compositions, low burning rates with relatively high pressure exponents compared to other oxidizer-containing compositions, and greater hygroscopicity (moisture sensitivity) than ammonium perchlorate.

Also, ammonium nitrate, exhibiting a very low crystal phase stability, passes through five distinct crystal phase changes in the temperature range of about $-17°$ C. to $169°$ C. The most disadvantageous change or transition is the Phase IV $\longleftrightarrow$ Phase III transition, occurring at about $32.3°$ C. This Phase IV to Phase III transition is characterized by a significant irreversible increase in crystal volume. Thus, repeated cycling of ammonium nitrate-based energetic compositions through the Phase IV to Phase III transition temperature has been said to cause growth of the grain and destruction of grain integrity. The result is an increased porosity and loss in mechanical strength in an ammonium nitrate-based energetic composition.

Over the years, numerous efforts to stabilize ammonium nitrate to prevent or sufficiently suppress the Phase IV$\longleftrightarrow$Phase III transition have been made. In the agrochemical field a wide variety of ingredients have been tried at one time or another to prevent caking.

So too in the energetic composition field, where efforts to stabilize ammonium nitrate against Phase IV$\longleftrightarrow$Phase III transition have included combining ammonium nitrate with such materials as potassium nitrate, zinc oxide, magnesium oxide, potassium fluoride and, for instance, nickel oxide; as well as certain lithium, calcium, barium, and aluminum salts; and other metal salts of the nitrate anion. Further, compounds such as urea, ethylene diamine dinitrate, diethylene triaminetrinitrate, guanidinium nitrate, silicates, and, for instance, melamine have also been investigated as ammonium nitrate stabilizers. None has proven entirely satisfactory. For instance, with regard to potassium nitrate, at least about 9 wt. %, generally about 10–15 wt. %, is introduced into the ammonium nitrate crystal lattice to prevent transition up to about $121°$ C. However, crystal stability is achieved, for instance, in propellant compositions only at the expense of increased pressure exponents, reduced energy performance, reduced density, and increased smoke, all of which make the use of potassium nitrate undesirable as a phase stabilizer. Ammonium nitrate stabilized with CuO or with about 3 wt. % NiO has been said to show little tendency to cake. However, such CuO and NiO-containing compositions present environmental hazards, sacrifice energetic performance, and present aging and processing problems in energetic formulations. Other metal salts have not sufficiently suppressed the Phase IV$\longleftrightarrow$Phase III transition.

Despite numerous efforts by numerous researchers to develop satisfactory phase-stabilized ammonium nitrate, no prior development has proven entirely adequate. The search for a solution has been complicated because the relative stabilizing effect of a given phase stabilizer is, in general, not predictable.

SUMMARY OF THE INVENTION

The phase-stabilized ammonium nitrate composition of the present invention comprises ammonium nitrate and phase-stabilizer in an amount effective to stabilize the ammonium nitrate. The phase stabilizer comprises at least one dinitramide salt having the formula $MX_n$ wherein M is a metal cation, X is the dinitramide anion, and n is 1, 2 or 3.

A method for phase-stabilizing ammonium nitrate comprises adding to ammonium nitrate an effective phase-stabilizing amount of the phase-stabilizer $MX_n$, wherein M, X and n have the meanings stated above, thereby producing a phase-stabilized ammonium nitrate composition.

The phase-stabilized ammonium nitrate of the present invention is non-caking and exhibits stabilization against the ammonium nitrate Phase IV $\longleftrightarrow$ Phase III transition.

Energetic compositions utilizing the phase-stabilized ammonium nitrate of the present invention exhibit energy-density levels exceeding those obtained using either unstabilized ammonium nitrate or commercially available conventional phase-stabilized ammonium nitrate and is therefore useful in energetic applications.

Energetic compositions utilizing the phase-stabilized ammonium nitrate of the present invention exhibit unexpected advantageous ballistic characteristics compared with either ammonium nitrate or commercially available conventional phase-stabilized ammonium nitrates.

The phase-stabilized ammonium nitrate of the present invention is advantageously employed in solid propellant compositions, and such propellant compositions exhibit unexpected useful properties, such as higher burn rate and lower pressure exponent as compared to propellant compositions containing non-phase-stabilized ammonium nitrate or currently commercially available conventional phase-stabilized ammonium nitrate.

DETAILED DESCRIPTION OF THE INVENTION

The phase-stabilized ammonium nitrate compositions according to the present invention comprise ammonium nitrate and a phase-stabilizing effective amount of a phase-stabilizer which comprises at least one metal dinitramide salt having the formula $MX_n$ wherein M is a metal cation, X is the dinitramide anion, and n is 1, 2 or 3. More particularly, M is a metal cation selected from the group consisting of metals from Groups IA, IIA, IIIA, IVA, VA, VIA, IB, IIB, IIIB, IVB, VB, VIB, VIIB, VIII and Lanthanide Elements (57–71) of the Periodic Table. Advantageously, M is selected from the group consisting of Li, Na, K, Rb, Cs, Ca, Ba, Sr, Mg, Cu, Ag, Au, Zn, Cd, Hg, Al, Sc, Y, Ga, B, In, Lanthanide Elements (57–71), Ti, Zr, Hf, Ge, Sn, V, Nb, Ta, Cr, Mo, W, Mn, Tc, Re, Fe, Co, Ni, Ru, Rh, Pd, Os, Ir, Pt, and mixtures thereof, with potassium being preferred.

PCT International Application WO 91/19669 (Dec. 26, 1991) and PCT international Application WO 91/19670 (Dec. 26, 1991) (corresponding to U.S. Pat. No. 5,198,204), the complete disclosures of which are incorporated herein by reference, describe methods for making dinitramide salts usefully employed in the present invention. Additional suitable procedures are described elsewhere herein.

The efficacy of a metal dinitramide salt as an ammonium nitrate phase-stabilizer is readily established utilizing thermal mechanical analysis (TMA) of pressed pellets of the sample composition. TMA is a recognized procedure for confirming the desired phase-stabilization of ammonium nitrate. As contemplated herein, phase-stabilization avoids, or at least sufficiently suppresses, the Phase IV$\longleftrightarrow$Phase III transition which, in repeated temperature cycling of stored ammonium nitrate or energetic compositions containing the same, can easily lead to catastrophic volume increases. Phase-stabilization is thus characterized by either a sufficiently significant reduction in or, preferably, elimination of the Phase IV$\longleftrightarrow$Phase III transition of ammonium nitrate, or a sufficient shift in the upper transition temperature from the high density Phase IV form to the Phase III form, i.e. from about 32.3° C. to a temperature exceeding, for example, 80° C. Phase stabilization, in essence, eliminates the irreversible volume changes associated with phase transitions. Phase transitions of ammonium nitrate ar described in Choi et al, *J. Appl. Cryst.* 13:403 (1980), the disclosure of which is incorporated by reference.

Ammonium nitrate is thus stabilized by the addition thereto of a phase-stabilizing effective amount of the desired metal dinitramide salt. This effective amount can vary depending upon the particular salt or combination of salts selected, and will be attained across a broad concentration range. The amount of phase-stabilizer employed ranges upwardly from about 1 wt. % based on the total weight of the phase-stabilized ammonium nitrate composition. More particularly, the phase stabilizer concentration ranges from about 5 wt. % to about 25 wt. %, and preferably from about 5 wt. % to about 15 wt. %, based on the total weight of the stabilized composition.

At the lower stabilizer concentration levels, the Phase IV$\longleftrightarrow$Phase III transition of ammonium nitrate is sufficiently suppressed, whereas at the higher concentration levels that transition is essentially eliminated. At present, no additional advantage is obtained using stabilizer concentration levels beyond that needed to eliminate essentially the undesired and deleterious Phase IV$\longleftrightarrow$Phase III transition.

One method for phase-stabilizing ammonium nitrate comprises dissolving a metal dinitramide salt and ammonium nitrate in an appropriate solvent, such as methanol, and precipitating the ammonium nitrate with metal dinitramide salt dispersed therein from the solution. Another method comprises admixing a selected metal dinitramide salt to an ammonium nitrate melt and thereafter cooling the stabilizer-containing melt. In this method a selected metal dinitramide salt is first dispersed throughout the melt. Still another method comprises physically mixing ammonium nitrate with a selected metal dinitramide salt followed by, optionally, melting the resulting admixture. The particular method selected for phase-stabilizing the ammonium nitrate will be dependant upon the solubility of the particular phase-stabilizer employed with the ammonium nitrate and ease of processing, with the proviso that the stabilizer is sufficiently evenly dispersed in the ammonium nitrate in order to obtain the desired phase-stabilized ammonium nitrate composition.

The ammonium nitrate for use in the present invention may be obtained commercially in bulk. Advantageously, the ammonium nitrate is anhydrous, or essentially moisture-free. The moisture content advantageously is substantially below about 0.5 wt %, and preferably below 0.1 wt. %.

The present phased-stabilized ammonium nitrate composition can also, if desired, contain minor amounts of anti-caking additives such as, for instance, silica clay (e.g. "Montmorillates"), Kaolin, and desiccants (e.g. MgO).

Unstabilized ammonium nitrate is unsuited for inclusion in propellant formulations, particularly in systems which contain high levels of ammonium nitrate and/or systems with broad storage temperature requirements. Addition of conventional stabilizers, however, undesirably results in a significant reduction in specific impulse. Current conventional phase-stabilized ammonium nitrate compositions, not according to the present invention, incorporate deleterious amounts of non-energetic stabilizers such as 5 to 15 wt. % potassium nitrate or 1 to 3 wt. % zinc oxide. The use of such non-energetic stabilizers dramatically reduces the energy of the propellant.

Propellant compositions prepared from the present phase-stabilized ammonium nitrate compositions which contain a metal dinitramide salt overcome the aforementioned and other art recognized drawbacks. The present phase-stabilized ammonium nitrate can be usefully incorporated into a high energy composition, such as a solid rocket propellant. A representative solid rocket propellant formulation comprises, for instance, the phase-stabilized ammonium nitrate composition, binder system, and, if desired, metallic fuel, plasticizer, ballistic additives, and/or co-oxidizer(s). The phase-stabilized ammonium nitrate is particularly suitable as an oxidizer in propellants which require no halogen-containing exhaust, i.e. as a replacement for ammonium perchlorate.

The present ammonium nitrate compositions phase-stabilized with a metal dinitramide salt can be usefully employed in a variety of propellant compositions and with a variety of binder formulations. Binder systems usefully employed in a propellant composition according to the present invention include substituted polyoxetanes, polyglycidyl azide, hydroxyl terminated polybutadiene (HTPB), polybutadiene-acrylonitrile acrylic acid terpolymer (PBAN), polyethers, polyglycidyl nitrate, and polycaprolactone, plus the appropriate curative. For example, a polyisocyanate curing agent is usefully employed with polyglycidyl nitrate, polyoxetanes, piolyglycidyl azide, hydroxy terminated butadiene, and polyethers (e.g. polypropylene glycol and polyethylene glycol) whereas an epoxy curing agent is usefully employed with other binders such as PBAN.

The propellant composition can, as desired, contain non-energetic or energetic plasticizers.

The propellant compositions can include a metal fuel, in fine particulate, i.e. powdered form, such as aluminum, beryllium, boron, magnesium, zirconium or mixtures or alloys thereof.

A reduced smoke or minimum smoke propellant formulation ion can be formulated without a metal fuel. The latter such propellant formulations can contain a ballistic catalyst, i.e. combustion additive, such as carbon, lead compounds, copper compounds, aluminum oxide or zirconium carbide.

The phase stabilized ammonium nitrate of the present invention finds advantageous utility in propellants wherein ammonium nitrate has found useful application. The complete disclosures of U.S. Pat. Nos. 5,076,868, 4,552,736, 4,707,540 and U.S. Application No. 07/634,391 filed Dec. 27, 1990, are hereby incorporated by reference.

A high-performance, low-cost, solid propellant composition according to the present invention comprises ammonium nitrate stabilized with a metal dinitramide salt plus suitable binder, and, if desired a metal fuel. An exemplary such propellant composition comprises 40–70 wt. % of the present phase-stabilized ammonium nitrate composition, 10–30 wt. % of a suitable metal fuel such as, for instance, powdered magnesium (800 microns > magnesium > 5 microns), and 9–30 wt % of a suitable binder. An additional exemplary useful propellant composition comprises 60–80 wt. % of the present ammonium nitrate stabilized with a metal dinitramide salt, 0–5% of a combustion additive, and 9–35 wt % of a suitable binder.

Comparison of a base line propellant composition containing a conventional potassium nitrate phase-stabilized ammonium nitrate versus a comparable propellant composition which contains phase-stabilized ammonium nitrate according to the present invention has been conducted. For instance, a formulation with 13 wt. % of aluminum particles (e.g. 3–200 microns), 28 wt. % polyglycidyl nitrate binder system which includes binder, curative, cure catalyst (as needed), and stabilizer, and 59 wt. % ammonium nitrate stabilized with 10 wt. % potassium dinitramide exhibits a vacuum specific impulse of 274.24 lbs thrust/lbs propellant/second at 1000 psi chamber pressure. A like formulation which utilizes ammonium nitrate stabilized with 10 wt. % potassium nitrate has a vacuum specific impulse of 270.97 lbs thrust/lbs propellant/second at 10 psi chamber pressure. The unpredictable but highly desirable increase in specific impulse of 3.27 seconds obtained with a propellant according to the present invention permits consideration of ammonium nitrate compositions for use in new propellant applications.

Another comparison between a further propellant composition according to the present invention and a propellant composition containing non-phase-stabilized ammonium nitrate yielded unexpectedly advantageous results. The propellant composition according to the present invention exhibited an unexpected increase in burn rate and unexpected decrease in pressure exponent as compared to the base line propellant composition. A propellant composition according to the present invention comprising a 70% total solids formulation based on 26.2 wt. % polyglycidyl nitrate (PGN) polymer and 23.0 wt. % Mg:Al alloy (57% Mg–43% Al, 10 microns), 47 wt. % of phase-stabilized ammonium nitrate (4.7 wt. % potassium dinitramide and 42.3 wt. % ammonium nitrate), 0.4 wt. % of a nitrate ester stabilizer (4-NDPA), 3.3 wt. % of a polyfunctional isocyanate curing agent (Desmodur N-100), 0.04 wt. % of acid scavenger, and 0.01 wt. % of a cure catalyst (such as triphenylbismuth) was prepared. A base-line propellant formulation comprising 26.2 wt. % polyglycidyl nitrate, 23 wt. % Mg:Al alloy (57% Mg - 43% Al; 10 microns), 47 wt. % non-stabilized ammonium nitrate (43 microns), 3.3 wt. % polyfunctional isocyanate curative (Desmodur N-100), 0.4 wt % nitrate ester stabilizer (4-NDPA), 0.04 wt. % of acid scavenger, and 0.01 wt. % of cure catalyst (such as triphenylbismuth) was similarly prepared. Suitable acid scavengers include non-nucleophilic hindered amines, maleic anhydride, and phthalic anhydride. The propellant according to the present invention had an improvement in propellant density and in vacuum specific impulse product. Cured strands of the propellant composition according to the present invention exhibited an unexpected improvement in burn rate at 2000 psi of 0.47 inches per second ("ips") with an unexpected but desired decrease in the pressure exponent to 0.62 whereas the base-line composition had a burn rate at 2000 psi of 0.37 inches per second ("ips") with an undesirable and higher pressure exponent of 0.81.

The present invention is further illustrated by the following non-limiting examples.

EXAMPLES

Unless stated otherwise, TMA and dinitramide analyses of the phase-stabilized ammonium nitrate compositions obtained in the Examples were performed.

Example 1

Phase-stabilized ammonium nitrate was obtained using a phase-stabilizing effective amount of potassium dinitramide.

To a solution of ammonium nitrate (45.5 grams) in 1.0 liter of analytical grade methanol was added potassium dinitramide stabilizer (4.5 grams) so as to form a potassium dinitramide-ammonium nitrate-methanol mixture. This suspension was heated to a temperature of about 60° C. to facilitate the complete dissolution of the stabilizer. The resultant clear solution was then evaporated, in vacuo, resulting in a white crystalline mass. The sample, thus prepared, was then dried to a constant weight in an oven under vacuum ($\approx 30°$ C./20 mm Hg). Samples of this material were examined by ion chromatography (IC), atomic absorption and inductively coupled plasma (ICP) for potassium and dinitramide content. The calculated theoretical value for potassium dinitramide was 10%; the amount found by ICP was 10.02% based on the potassium content, with the potassium dinitramide content being 9.24% based on chromatographic analysis of dinitramide.

Example 2

Phase-stabilized ammonium nitrate was obtained using a phase-stabilizing effective amount of potassium dinitramide. The potassium dinitramide was prepared as follows.

Acetonitrile (50 ml, Aldrich anhydrous) was introduced into a 250 ml three neck round bottom flask equipped with an argon inlet, thermometer, stir bar, and gas outlet. The flask and its contents were immediately cooled to −38° C. in a liquid nitrogen/acetonitrile bath. To the cooled contents was then added nitronium tetrafluorborate (4.7 grams, 0.035 mol). As soon as the temperature had re-equilibrated, dipotassium nitrourethane (3.0 grams, 0.018 mol) was added portionwise such that the temperature did not exceed −35° C. The resulting suspension was stirred while allowing the temperature to rise to −19° C. until no further gas evolution was detected by visual inspection. The contents were then recooled to a temperature of about a −38° C. and a solution of KOH (5.9 grams, 0.106 mol) in absolute alcohol (50 ml) was slowly added while monitoring the temperature such that it did not rise above −20° C. The contents of the reaction flask were then passed through a pad of silica gel on a glass frit, washed with several portions of ethyl acetate and the combined filtrate was evaporated in vacuo. The resulting pale yellow solid, having a melting point of 108° C., was pure potassium dinitramide (260 mg) as determined by ion chromatography.

Example 3

Phase-stabilized ammonium nitrate was obtained using a phase-stabilizing effective amount of potassium dinitramide. The potassium dinitramide was prepared as follows.

In a 250 ml round bottom flask, equipped with a thermometer, an argon inlet, a stir bar, and a drying tube there was introduced a suspension of the oil-free potassium hydride (1.62 grams) in 100 ml of freshly distilled tetrahydrofuran (THF). The flask was immersed in an ice water bath and the contents were allowed to come to 0° C. Ammonium dinitramide (5.0 qrams, 0.04 mole) which had been dissolved in 50 ml of dry THF was then added via cannula to the suspension at a rate such that the reaction did not become too vigorous ($NH_3$ and $H_2$ evolution). The mixture, removed from the bath, was then stirred for 15 minutes at 0° C., and then allowed to come to room temperature over a 40 minute period. The solution was then purged with nitrogen for several minutes to remove any dissolved ammonia. The entire contents of the flask were added to 300 ml of anhydrous ether. The resulting solid (6.5 grams) was collected, washed with ether and dried. The thus obtained tan solid was dissolved in acetonitrile with heating, the insoluble materials were removed by filtration, and the clear filtrate was allowed to cool in an ice bath. The resulting crystalline solid, having a melting point of 109°–111° C., was analyzed with ion chromatography (IC) and inductively coupled plasma (ICP), and was determined to be high purity potassium dinitramide.

Example 4

Phase-stabilized ammonium nitrate is obtained using a phase-stabilizing effective amount of zinc dinitramide. The zinc dinitramide salt was prepared as follows.

Ammonium dinitramide (0.5 grams, 4.0 mmole) in 15 ml of freshly distilled tetrahydrofuran (THF) was placed in a 50 ml three neck round bottom flask equipped with a stir bar, an argon inlet, a thermometer, and a gas outlet. The flask was immersed in an ice bath and the temperature was allowed to drop to 0° C. To this solution was slowly added a 15% solution of diethyl zinc in toluene (Aldrich, 1.82 ml, 2.0 mmole) such that the temperature did not exceed 3° C. After 1 hour the resulting solid precipitate was collected on a glass frit, and washed several times with anhydrous ether. The resulting amorphous solid (310 mg) had a melting point of 157°–159° C. (with decomposition). The washings yielded an additional 100 mg of pale green well-formed cubic crystals. The combined solids were analyzed using the inductively coupled plasm (ICP) and ion chromatography (IC) techniques, and were determined to be essentially pure $Zn(N(NO_2)_2)_2$.

Example 5

Phase-stabilized ammonium nitrate was obtained using a phase-stabilizing effective amount of potassium dinitramide. The potassium dinitramide was prepared from urethane and acetyl nitrate as follows.

In a jacketed 500 ml four neck round bottom flask equipped with a thermometer, top stirrer, and drying tube was placed 25 ml (AR grade) dichloromethane and 22.3 grams of ethyl carbamate. The flask and its contents were immediately cooled to −10° C. with a refrigeration unit. To the cooled contents was then added acetyl nitrate solution (prepared in the normal fashion from 94.5 ml of acetic anhydride and 35 ml of 90% nitric acid), not allowing the temperature to exceed 25° C. The addition took roughly one hour, and after an additional hour at −10° C., the reaction was monitored by gas chromatography for the disappearance of urethane and subsequently the consumption of nitrourethane. When the reaction had been judged to be complete, a strong solution of KOH in ethanol was added between −5° C. and +5° C. Enough of the base solution was added such that the pH was 8.18 (potentiometric). Following this addition the reaction was stirred for 30 minutes and then filtered to remove the solids which had precipitated. The filter cake was washed with several portions of ethyl acetate, the filtrate and washings combined, and the solvents removed in vacuo. The yellow residue contained much acetic acid and acetic anhydride which were removed by evaporation at ambient temperature at ~1 mm Hg. The resultant pasty solid was recrystallized several times from isopropanol to remove much of the potassium acetate and then from acetonitrile yielding 4 g of potassium dinitramide, still contaminated with much potassium acetate. This sample was determined to be ~13% potassium dinitramide by ion chromatography.

Example 6

Phase-stabilized ammonium nitrate was obtained using a phase-stabilizing effective amount of potassium dinitramide. The potassium dinitramide was prepared from nitro urethane and $N_2O_5$ as follows.

In a 150 ml single neck round bottom flask with a stopcock sidearm and equipped with a magnetic stir bar and glass stopper, was placed 4.0 g, 37.0 mmole, of $N_2O_5$. The flask was immersed in a cooling bath at −50° C., and 25 ml of acetonitrile was added with stirring. The bath was allowed to warm to −30° C., and nitrourethane, 4.47 g, 33.33 mmole was added in one portion. A stream of $O_2/O_3$ was then introduced through the sidearm (not essential), and the reaction was allowed to stir under these conditions for 2 hours. After this time 12 ml of a solution of 26 g of potassium methoxide in 50 ml methanol was added dropwise over 5 minutes. Stirring was continued for one half hour, at which time the solids were collected on a frit, 7.4 g, (mostly $KNO_3$). The yellow filtrate was concentrated and the resultant oil dissolved in warm methanol. Upon cooling white needles were deposited, these were collected, washed with ethyl acetate and then ether, 700 mg. Meanwhile the solid filter cake was re-extracted with hot hot methanol, hot filtered and the filtrate concentrated and cooled. The white solid which formed was collected on a glass frit, washed with ethyl acetate, then ether and dried, 1.90 g potassium dinitramide. The total mass of potassium dinitramide obtained was 2.60 g, 40%.

Example 7

Lithium dinitramide was prepared as follows.

To a solution of 0.50 g, 4.0 mmole, ammonium dinitramide in 25 ml anhydrous THF was added 1.60 ml of 2.5M n-BuLi in hexanes at −78° C. This homogenous solution was allowed to warm slowly to room temperature while passing a stream of nitrogen through the solution to remove ammonia. The solution was then evaporated in vacuo, and the resulting yellow oil dissolved in dry ethyl ether and hexanes added until it became turbid. Upon cooling white needles of lithium dinitramide were deposited (mp. 84°-86° C.). These were collected by filtration and washed with hexanes. Analysis of dinitramide by ion chromatography showed 46% lithium dinitramide. Analysis of lithium content by atomic absorption showed 52.1% lithium dinitramide.

Example 8

Phase-stabilized ammonium nitrate was prepared by using a mixture of lithium dinitramide and potassium dinitramide. The lithium dinitramide of Example 7 was used. Unused potassium dinitramide from the preceding Examples or further materials prepared in a like manner were combined, and were the source of potassium dinitramide used in this Example.

To a warm solution of 1.66 g of an ammonium nitrate composition (90% ammonium nitrate and 10% potassium dinitramide) in 25 ml of methanol was added 84 mg of lithium dinitramide (roughly 50% pure). Once the solution had clarified, the solvent was removed in vacuo. The resulting solid was dried in a vacuum oven at 40° C. overnight. Analysis by ion chromatography for dinitramide; calculated:10.70%, found: 10.01%. Potassium and lithium analysis by atomic absorption showed 8.61% potassium dinitramide and 5.3% lithium dinitramide.

Example 9

Cerium dinitramide was prepared as follows.

To a solution of 0.5o g, 4.0 mmole, ammonium dinitramide in 25 ml ethanol was added a solution of 1.09 g, 4.44 mmole of cerium trichloride in ethanol. The homogenous solution was cooled in an ice bath whereupon a white solid was deposited. This solid (NH₄Cl) ~300 mg was collected by filtration. The filtrate was concentrated to on fourth of its original volume and then treated with ethyl acetate until it became turbid. An additional crop of pale yellow solid was then obtained (~300 mg of CeCl₃). The filtrate was then evaporated leaving a yellow oil which solidified when triturated with cyclohexane. This material was analyzed for cerium by inductively coupled plasma, calculated: 30.57% Ce, found: 29.4%. Ion chromatography indicated that the counterion was dinitramide (cerium dinitramide: 94.3%).

Example 10

Phase-stabilized ammonium nitrate was prepared using a mixture of cerium dinitramide and potassium dinitramide. The cerium dinitramide of Example 9 was used. Unused potassium dinitramide from the prior Examples or further materials prepared in a like manner were combined, and were the source of potassium dinitramide used in this Example.

To a warm solution of 1.48 g of an ammonium nitrate composition (90% ammonium nitrate and 10% potassium dinitramide) in 25 ml of methanol was added 74 mg of cerium dinitramide. Once the solution had clarified, the solvent was removed in vacuo. The resulting solid was dried in a vacuum oven at 40° C. overnight. Analysis by atomic absorption for potassium and cerium calculated: K: 2.70%; Ce: 1.53%, found K: 2.83%; Ce: 1.2–2.4%. Analysis by ion chromatography for dinitramide, calculated:10.70%, found: 10 3%.

Example 11

To a solution of 833 mg of phase-stabilized ammonium nitrate (ammonium nitrate phase-stabilized with potassium dinitramide) prepared as in Example 1 in 25 ml of absolute methanol were added a further 278 mg of ammonium nitrate so as to form a suspension of the potassium dinitramide and ammonium nitrate in methanol. This suspension was heated to a temperature of about 60° C. to facilitate complete dissolution. The resultant clear solution was then evaporated, in vacuo, resulting in a white crystalline mass. The sample, thus prepared, was then dried to a constant weight in an oven under vacuum (roughly 30° C./20 torr). Samples of this material were examined by ion chromatography (IC), atomic absorption, and inductively coupled plasma (ICP) for potassium an dinitramide content. The calculated theoretical value for potassium dinitramide content was 7.5 percent; the amount found by ICP was 8.24 percent based on a potassium content with the potassium dinitramide content being 6.35 percent based on IC analysis of dinitramide.

Example 12

To a solution of 154.7 mg of ammonium nitrate 10 ml of absolute methanol were added 51.6 mg of potassium dinitramide so as to form a suspension of the potassium dinitramide and ammonium nitrate in methanol. This suspension was heated to a temperature of about 60C to facilitate complete dissolution. The resultant clear solution was then evaporated, in vacuo, resulting in a white crystalline mass. The sample, thus prepared, was then dried to a constant weight in an oven under vacuum (roughly 30° C./20 torr). Samples of this material were examined by ion chromatography (IC), atomic absorption, and inductively coupled plasma (ICP) for potassium and dinitramide content. The calculated theoretical value for potassium dinitramide content was 25.0 percent; the amount found by ICP was 28.7 percent based on potassium content with the potassium dinitramide content being 20.49 percent based on IC analysis of dinitramide.

What is claimed is:

1. Phase-stabilized ammonium nitrate composition comprising ammonium nitrate and a phase-stabilizer comprising at least one metal dinitramide salt having the formula $MX_n$ wherein M is a metal cation, X is a dinitramide anion, and n is 1, 2 or 3, said metal dinitramide salt being present in a phase stabilizing amount.

2. The phase-stabilized ammonium nitrate composition according to claim 1 wherein M is selected from the group consisting of lithium, cerium, potassium, zinc, and mixtures thereof.

3. The phase-stabilized ammonium nitrate composition according to claim 1 wherein M is potassium.

4. The phase-stabilized ammonium nitrate composition according to claim 1 wherein said composition contains a combination of metal dinitramide salts.

5. The phase-stabilized ammonium nitrate composition according to claim 1 wherein said phase stabilizer is selected from the group consisting of (i) potassium dinitramide and lithium dinitramide and (ii) potassium dinitramide an cerium dinitramide.

6. The phase-stabilized ammonium nitrate composition according to claim 1 wherein M is a Lanthanide Element (57–71).

7. The phase-stabilized ammonium nitrate composition according to claim 1 wherein said phase-stabilizer is present in an amount ranging from about 1 wt. % to about 25 wt. %, based on the total weight of said composition.

8. The phase-stabilized ammonium nitrate composition according to claim 1 wherein said stabilizer is present in an amount ranging from about 5 wt. % to about 15 wt. %, based on the total weight of said composition.

9. The phase-stabilized ammonium nitrate composition according to claim 1 wherein said metal dinitramide salt is present in an amount of at least about 1 wt. % of the total weight of said composition and M is a metal cation selected from the group consisting of Li, Na, K, Rb, Cs, Ca, Ba, Sr, Mg, Cu, Ag, Au, Zn, Cd, Hg, Al, Sc, Y, Ga, B, In, Lanthanide Elements (57–71), Ti, Zr, Hf, Ge, Sn, V, Nb, Ta, Cr, Mo, W, Mn, Tc, Re, Fe, Co, Ni, Ru, Rh, Pd, Os, Ir, Pt, and mixtures thereof.

10. A solid propellant comprising a binder system and the phase-stabilized ammonium nitrate composition according to claim 1.

11. A method for phase-stabilizing ammonium nitrate comprising adding an effective amount of a phase-stabilizer to ammonium nitrate, said phase-stabilizer comprising at least one metal dinitramide salt having the formula $MX_n$ wherein M is a metal cation, X is a dinitramide anion, n is 1, 2 or 3 whereby phase-stabilized ammonium nitrate is obtained.

12. A solid propellant according to claim 10, wherein said binder system comprises at least one member selected from the group consisting of polyoxetanes, polyglycidyl azide, hydroxyl terminated polybutadiene, polybutadiene-acrylonitrieleacrylic acid terpolymer, polyethers, polyglycidyl nitrate, and polycaprolactone; and, optionally, a curative.

13. A solid propellant according to claim 12, wherein said propellant contains a metal fuel.

14. A solid propellant according to claim 13, wherein said metal fuel is selected from the group consisting of aluminum, beryllium, boron, magnesium, zirconium, mixtures thereof, and alloys thereof.

15. A solid propellant according to claim 12, wherein said solid propellant is a metal-free reduced smoke or minimum smoke propellant which contains a ballistic additive.

16. A method for phase-stabilizing ammonium nitrate according to claim 11, wherein M is selected from the group consisting of lithium, cerium, potassium, zinc, and mixtures thereof.

17. A method for phase-stabilizing ammonium nitrate according to claim 11, wherein M is potassium.

18. A method for phase-stabilizing ammonium nitrate according to claim 11, wherein said phase stabilizer comprises a combination of metal dinitramide salts.

19. A method for phase-stabilizing ammonium nitrate according to claim 11, wherein said phase stabilizer is selected from the group consisting of (i) potassium dinitramide and lithium dinitramide and (ii) potassium dinitramide and cerium dinitramide.

20. A method for phase-stabilizing ammonium nitrate according to claim 11, wherein M is a Lanthanide Element (57–71).

21. A method for phase-stabilizing ammonium nitrate according to claim 11, wherein said stabilizer is present in an amount ranging from about 5 wt. % to about 15 wt. %, based on the total weight of said composition.

22. A method for phase-stabilizing ammonium nitrate according to claim 17, wherein said stabilizer is present in an amount ranging from about 5 wt. % to about 15 wt. %, based on the total weight of said composition, and M is selected from the group consisting of lithium, cerium, potassium, zinc, and mixtures thereof.

23. A method for phase-stabilizing ammonium nitrate comprising adding about 1 wt. % to about 25 wt. % of a phase-stabilizer to ammonium nitrate, said phase-stabilizer comprising at least one metal dinitramide salt having the formula $MX_n$ wherein M is a metal cation selected from the group consisting of Li, Na, K, Rb, Cs, Ca, Ba, Sr, Mg, Cu, Ag, Au, Zn, Cd, Hg, Al, Sc, Y, Ga, B, In, Lanthanide Elements (57–71), Ti, Zr, Hf, Ge, Sn, V, Nb, Ta, Cr, Mo, W, Mn, Tc, Re, Fe, Co, Ni, Ru, Rh, Pd, Os, Ir, Pt, and mixtures thereof, X is a dinitramide anion, and n is 1, 2 or 3, whereby phase-stabilized ammonium nitrate is obtained.

* * * * *